April 28, 1970     G. H. STICKNEY     3,508,648
SORTER AND STACKER
Filed July 20, 1967     4 Sheets-Sheet 1
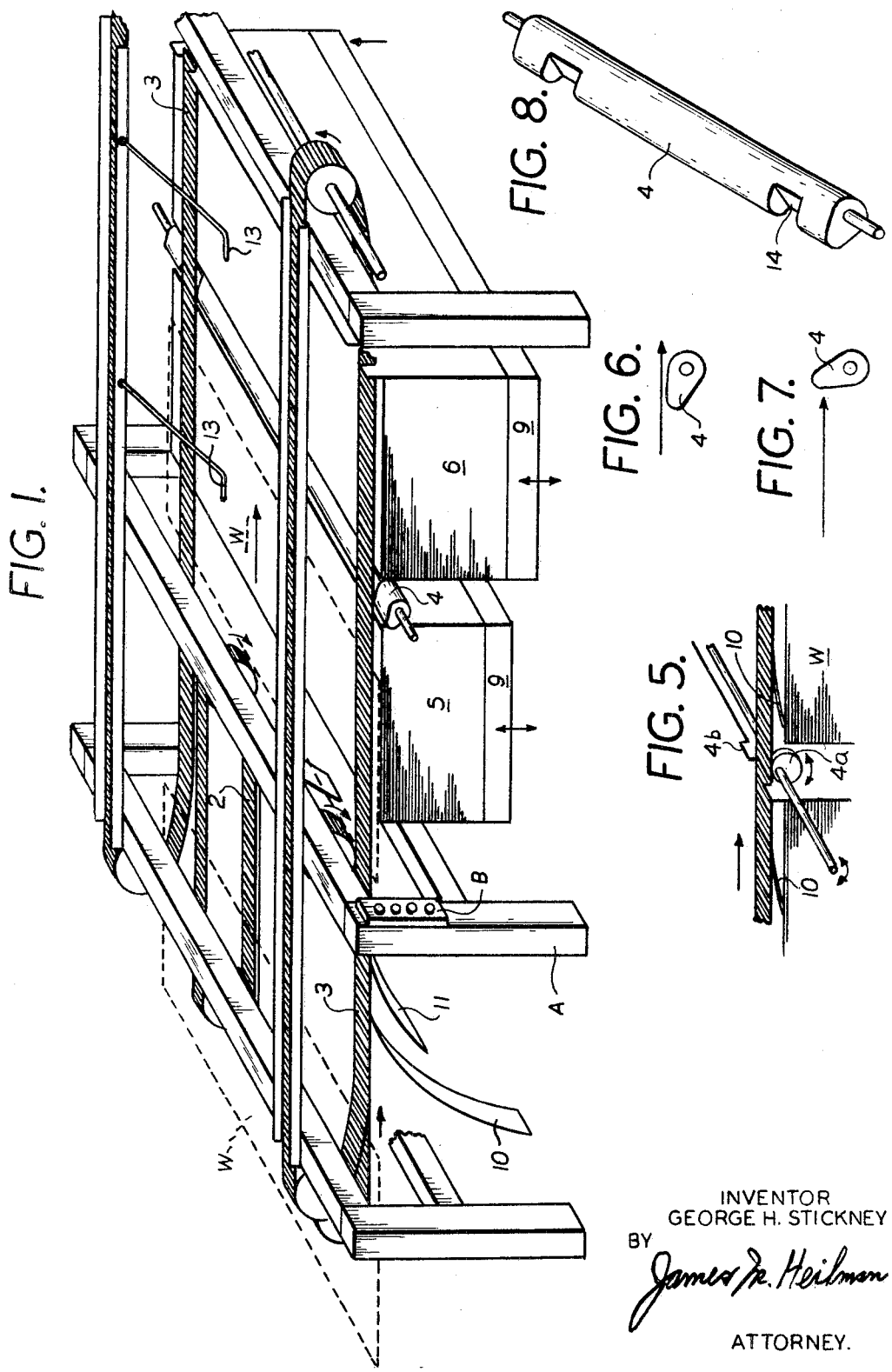
INVENTOR
GEORGE H. STICKNEY
BY
*James R. Heilman*
ATTORNEY.

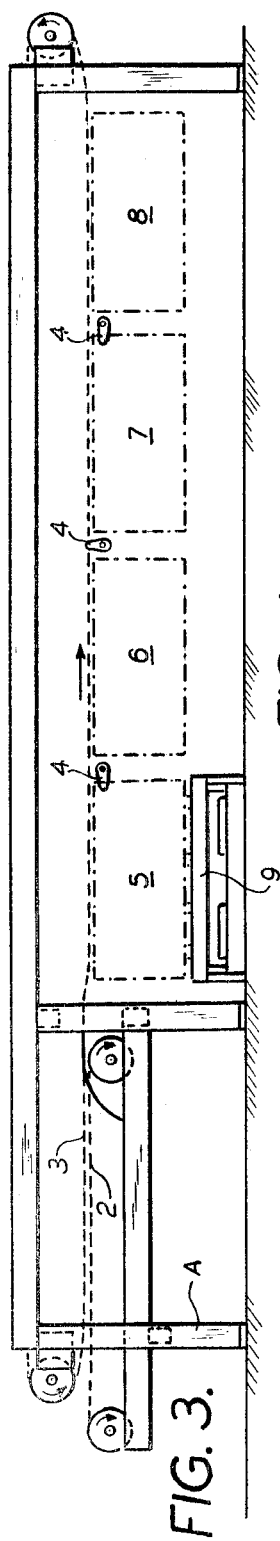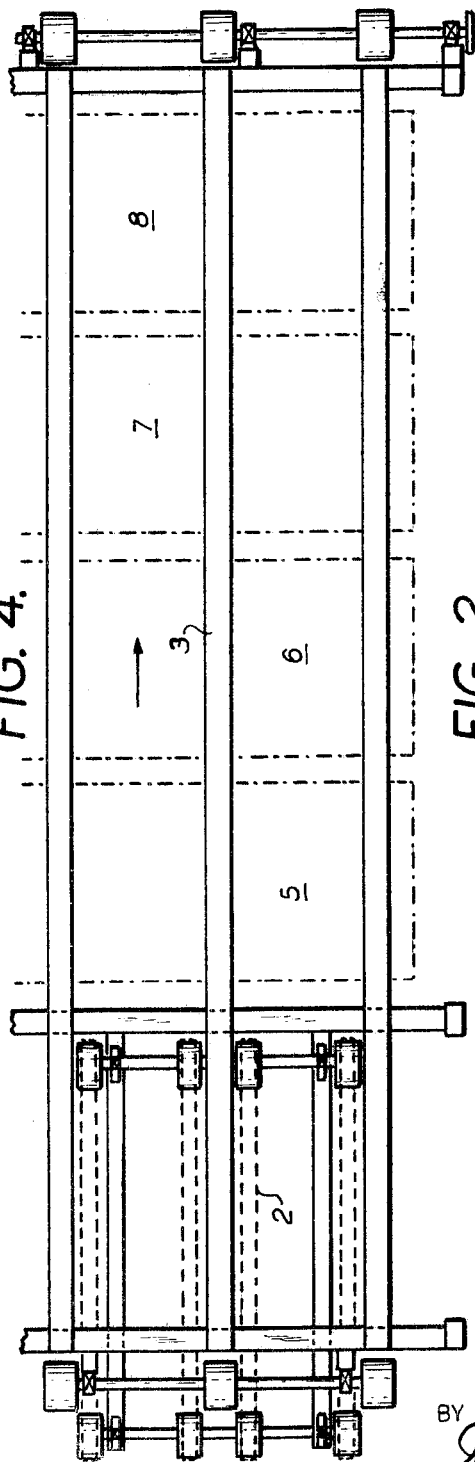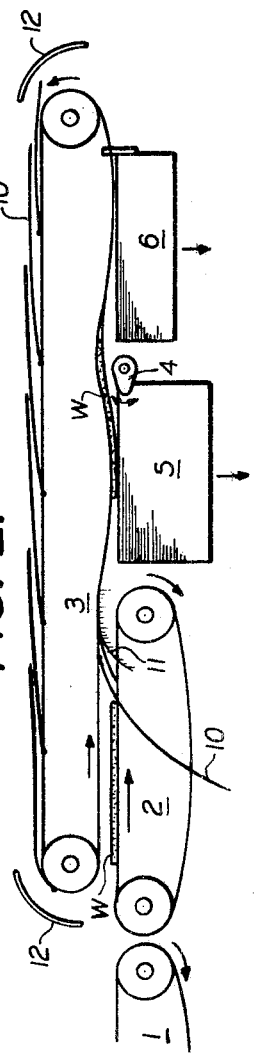

April 28, 1970     G. H. STICKNEY     3,508,648
SORTER AND STACKER
Filed July 20, 1967     4 Sheets-Sheet 3
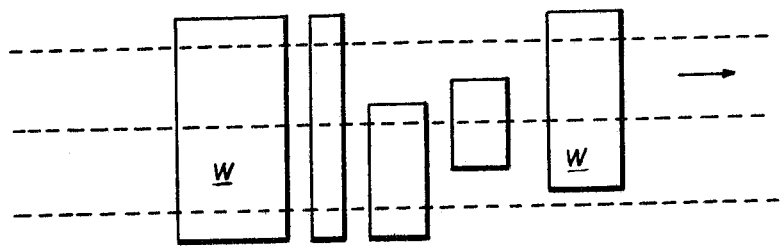
FIG. 9.
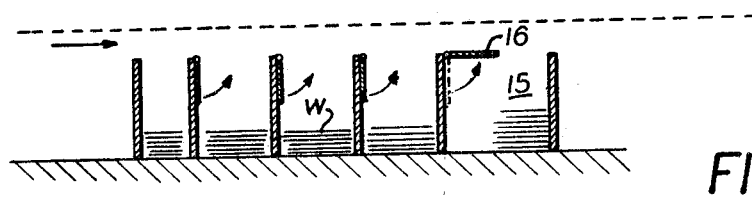
FIG. 10.
FIG. 11.
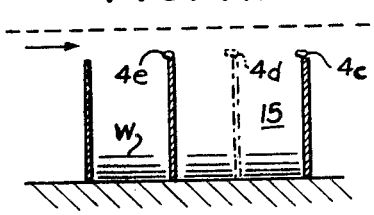
FIG. 12.
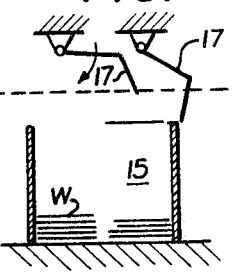
FIG. 13.
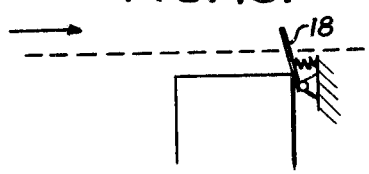
FIG. 14.
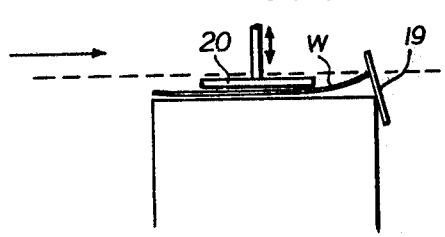
FIG. 15.
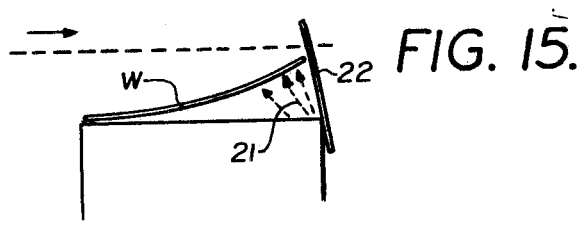
INVENTOR
GEORGE H. STICKNEY
BY
James M. Heilman
ATTORNEY.

INVENTOR
GEORGE H. STICKNEY
BY
James M. Heilman
ATTORNEY.

United States Patent Office 3,508,648
Patented Apr. 28, 1970

3,508,648
SORTER AND STACKER
George H. Stickney, Vancouver, British Columbia, Canada, assignor to Weldwood of Canada Limited, Vancouver, British Columbia, Canada, a corporation of Canada
Filed July 20, 1967, Ser. No. 654,910
Int. Cl. B65h 29/18
U.S. Cl. 209—74                                22 Claims

ABSTRACT OF THE DISCLOSURE

An apparatus and method to sort and stack sheets or plies or various types of material, such as, wood veneers, lumber, etc., whereby to increase plant productivity by decreasing manpower and minimizing damage to material due to manual handling.

An object of this invention is to produce an apparatus and a method for sorting and stacking sheets or plies of material, preferably relatively flat material, such as, wood veneer, lumber, or other substantially rectangular shaped items, and thereby increase plant productivity by decreasing necessary manpower, and minimizing damage caused by manual handling.

Another object is to produce a machine and method that will handle concurrently a variety of sizes with respect to thickness, length, and width, and will sort as to sizes, grades (for example, grades as set forth in various wood and wood products Commercial Standards), moisture content, etc.

The apparatus and method are described specifically in connection with the sorting and stacking of wood veneers, and wood boards, but it is understood that it is equally applicable to other plies of sheet material. The apparatus would normally be set up at the "out" side of a drier, but could be a continuation of the conveyor beyond the drier. Also, the apparatus could be positioned at the end, or as a continuation, of the "green chain."

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing, and that the structural details or particular steps of the method herein set forth may be varied to suit particular purposes and still remain within the inventive concept. Where specific dimensions, quantities, or materials are set forth, these are merely illustrative and may be varied within a wide range therefrom.

Referring generally to the drawings:

FIG. 1 is a schematic view of the sorting apparatus showing two stacking or sorting bins.

FIG. 2 is a schematic side view of the apparatus of FIG. 1.

FIG. 3 is a schematic side view of the apparatus showing a series of four stacking bins.

FIG. 4 is a top plan view of FIG. 3 but with sorting stops omitted.

FIG. 5 is a modified stop and cam arrangement, and a roller chain flap conveyor.

FIGS. 6 and 7 are side views showing the preferred pear shaped stop in inoperative and operative positions, respectively.

FIG. 8 is a perspective view showing the details of the stop illustrated in FIGS. 6 and 7.

FIG. 9 is a plan view illustrating various sizes of material being sorted during the same operation.

FIGS. 10, 11, and 12 are side views showing various arrangements for utilizing bins for stacking reduced sizes.

FIGS. 13, 14 and 15 illustrate several types of veneer cushioning stop means.

Figure 16:
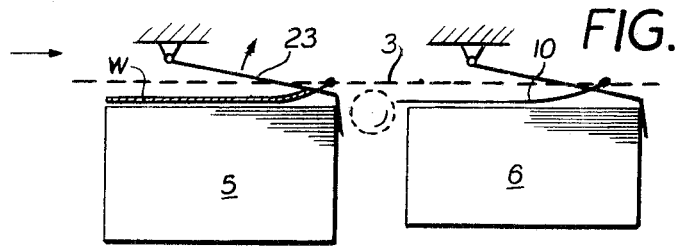
Figure 17:
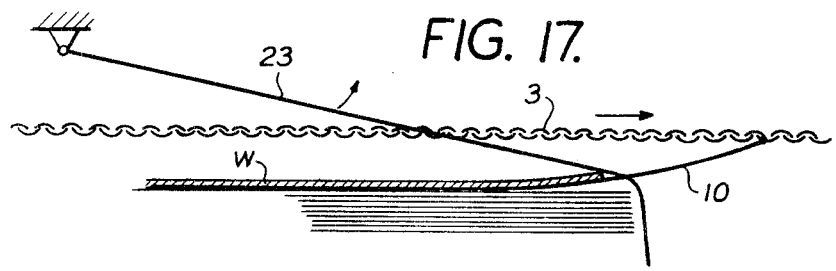

FIG. 16 shows overhead hinged stops, while FIG. 17 is an enlarged detail view of one of the stops illustrated in FIG. 16.

Figure 18:
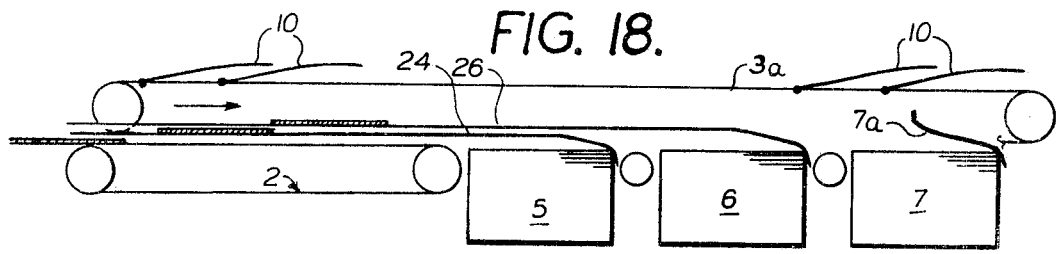
Figure 19:
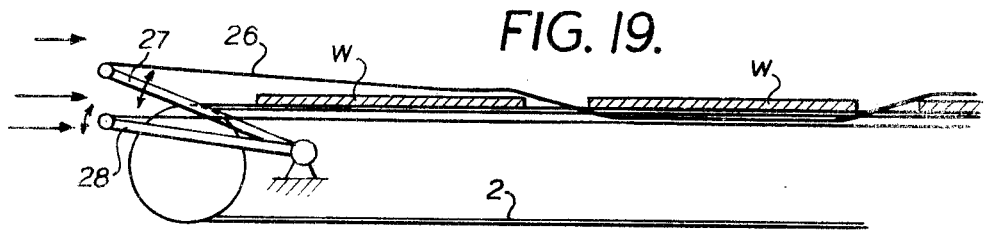
Figure 20:
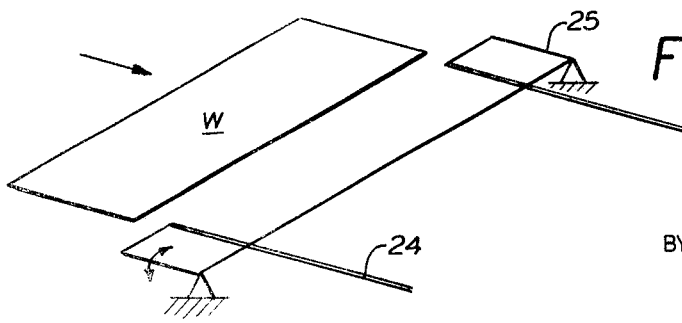

FIG. 18 is a side schematic view of a modified sorting construction using lead or lead-in lines, while FIG. 19 shows an enlargement of the feeding or entrance point, and FIG. 20 shows the details of the sorting leads.

Referring generally to FIGS. 1, 2, and 3, the equipment consists of four main components:

(A) Speed-up conveyor 2
(B) Overhead flap conveyor 3
(C) Sorting mechanism 4
(D) Stacking or receiving bins 5, 6, 7, and 8, on hoists 9 for each sort.

As illustrated in FIG. 2, numeral 1 represents a conventional conveyor carrying the work, i.e., either dry veneer or lumber W from the drier, or green veneer or lumber from the "green chain" line and passing it to the speed up conveyor 2. The speed-up conveyor will force the veneer into the pocket formed by the immediate preceding flap 10 and the flap conveyor 3. Optional dead skids or guides 11, like conveyors 2 and 3, are mounted on any conventional supporting frame A, and will carry the veneers over the first edge of bin 5, and if stop 4 is rotated to an operative or upright position the veneer will drop in bin 5. Guards 12 prevent flaps 10 from swinging widely.

Reverting to the speed-up conveyor 2, this assembly is made up of preferably four 4" flat belt sections assembled into a multisection, flat belt conveyors about 14 feet long. Obviously, the number of the elements, and their dimensions, herein given, as mentioned before, may be varied widely, and are given merely for illustrative purposes.

The flap conveyor 3 is preferably made up of three strands of roller chain or belting material. Four-inch belting flaps 10, approximately 4'6" long, at one end, are attached to the chains on a spacing of about 2'6" whereby substantial overlapping occurs. The bottom run or strand of the flap conveyor is held about 3" above the top of the speed-up conveyor 2. The tail pulley of the flap conveyor overlaps the head pulley end of the speed-up conveyor by about 7'6".

The longitudinal spacing of the supporting sprockets for the flap conveyor is such that the free ends of the belt flaps fall between and below the top belts of the speed-up conveyor (see FIGS. 2 and 4). The loose ends of the belt flaps are supported about 1 inch below the speed-up belts.

The bottom strand or run of the flap conveyor and the top strand of the speed-up conveyor travel in the same direction, with the speed-up conveyor running faster than the flap conveyor. Thus, as mentioned previously, veneer W carried along by the speed-up conveyor is passed into the space or pocket between the hanging belt flap and the roller chain. Because of the speed differential, the veneer carried by the speed-up conveyor will catch up to the point where the flaps are attached to the chain at which time the veneer will be held back by the flap, and the speed-up belt will slide freely under the veneer.

Just ahead of the pulley of the speed-up conveyor is a fixed inclined skid or guide 11 which is in the path of the belt flaps, and which extends upward to a level about 1″ above the top of the speed-up conveyor. Up to this point, the veneer is supported by the speed-up conveyor, but as the belt flap is pulled up the inclined skid, the space between the flap and the roller chain is closed and the veneer is gripped between the chain and the flap. The grip between the flap and the chain is quite loose and, in reality, the veneer is carried on the flap.

Instead of the flap conveyor being formed of 3 strands of roller chain, 3 strands of nylon or rubber impregnated transmission belting may be used. Likewise, one belt may be used, but the width should then be in the range from 6″ to 12″ or wider.

The first stack 5 is located immediately after the head pulley of the speed-up conveyor 2. In order to keep the pocket between the flap and roller chain closed, it is necessary to keep the scissor or other type lifts 9 in the receiving stations 5 to 8 indexed. This is done by conventional sensing or level control devices 13 to bring the top of the stack to a level about 1″ below the roller chain conveyor 3.

Stacking down is accomplished by raising a stop 4 having belt cut-out sections 14 on the downstream side of the stacking station. The stop holds the veneer while the flap is pulled out from under, leaving the veneer resting on the previously sorted veneers on the lift. If the stop is not raised (see FIG. 2), then the veneer is carried to the next station and so on.

Actuation of the stop mechanism may be directly controlled by an operator. However, a conventional shift-register memory circuit may be employed to permit the grader to be at least six sheets removed from the first stacking station.

When the sort station is full, the line is stopped and the scissor lift is lowered and the load rolled out. The empty lift is then raised and a caul board, i.e., a sturdy base support board or panel is manually placed on the dry belt 1 and fed through the stacker and onto the lift 9. The stacker handles the caul board just like a piece of veneer. The veneer sorting operation is then resumed.

For continuous operation, the unit preferably would be equipped with an automatic caul board injector and accumulator finger. With such a system when the bin is full, a caul board would be fed into the flap conveyor, and the grader would direct it to the full bin. When the caul board reaches the bin, the accumulator fingers would extend and catch it. The lift and load would then be lowered and emptied. Cauls are unnecessary for stacking, but are desirable for later veneer handling.

Veneer in the system when the full signal was first given would continue to be piled on the nearly full stack and taken away with the stack. Veneer designated for that same bin after the caul board has been introduced would be retained on the caul board resting on the accumulator fingers. The empty lift would immediately return to a position under the caul board and the accumulator fingers would be withdrawn.

Many modifications are readily apparent. For example, the modified cam 4a and stop 4b in FIG. 5 may replace cam 4 of FIG. 2. When the operator actuates and raises cam 4a, the flaps 10 will carry the veneer over positive stop 4b to the next sorting station. Note that all sizes may be sorted as illustrated in FIG. 9.

A belt having a friction surface or small suction cups thereon could be substituted for the flap conveyor belt 3. Likewise, other types of conventional sensing means, such as, photoelectric cells, weight or quantity actuating means, etc., could be substituted for the overhead finger contact type sensing means 13.

FIGS. 10, 11 and 12 show dual uses for sorting bins. In FIG. 10, bins 15 are provided with a hinged shelf arrangement 16 which is operated by conventional automatic means to use a larger bin for smaller lengths. In FIG. 11, extra stops 4d are provided along the side of bins 15, intermediate regular stops 4c and 4e, to permit 2 (or more) sorts in a single bin. In FIG. 12, intermediate overhead stops 17 are provided for the same purpose.

Cushioning means in order to minimize veneer cracking and breaking are illustrated in FIG. 13 by a spring loaded stop 18; in FIG. 14 by a resilient stop 19 and a reciprocating pressure speed reducing plate; and in FIG. 15, by using the air currents 21 in front of stop 22 to slow down the speed of the veneer and cushion its fall.

FIG. 16 is a view of an apparatus generally similar to that shown in FIG. 2, but with an overhead type stop mechanism similar to that illustrated in FIG. 12. In this construction, an overhead hinge stop 23 is used instead of the pear-shaped stop 4, or cam and barrier 4a and 4b. FIG. 17 is an enlargement of the stop mechanism illustrated in FIG. 16. Note that the top veneer in the stack, by friction, slows down the speed of the incoming veneer.

FIGS. 18, 19 and 20 illustrate a modified form of the device in which lead-in wires, or lead-in strips 24, 26 guide the veneers or lumber boards to their respective bins. Lead lines 24 are secured to pivoted frame 25, while lead lines 26 are secured to frame 27. Depending on whether the board or veneer is placed above or beneath any particular lead line will determine the bin to which it is to be guided.

For clarity, friction conveyor belt 3a is not completely shown, and the lead-in lines are shown separated even though in operation the leads would lie on the veneer or panels. They should be taut, but not tight enough to impede the progress of the veneer. When the appropriate stack is reached, and the lead line dead-ends, the veneer would be dropped into the stack. Either wire or strips could be used as the lead-in lines, and they could be made of steel wire, nylon, or any other appropriate material. The lead-in lines preferably would be in pairs and the entrance would be such so as to place the veneers between the desired pairs of lead-in wires where it would be carried until the lead dead-ends. 7a is merely a bin stop.

The potential for this sorter and stacker in the wood industry and other industries is unlimited. The construction is simple, and inexpensive. Its ability to handle fragile veneers without causing damage makes it doubly valuable, and this is particularly true when dry veneers are hand-pulled. The stacker is available in sorting cut-to-size configurations, and offers much flexibility while maintaining freedom from panel damage.

By taking signals directly from a clipper or moisture senser, or both, and with the ability to handle veneer at relatively high speeds through automatic controls such as shown at B, FIG. 1, this invention gives the ability for complete automation of boards, plywood, dry, and green veneer lines. The apparatus has been run at 200′/min. successfully, and work indicates that speeds of 300′/min. are practical, and further improvement will probably raise this limit.

The embodiments of the invention in which an exclusive property or privilege is claimed are defined as follows:

1. A sorting and stacking apparatus comprising a fast-moving speed-up conveyor for conveying substantially flat sheets of material, a second slower moving conveyor adjacent said first speed-up conveyor and having means to receive and restrain material received from said first speed-up conveyor, and means adjacent said second slower moving conveyor for forcing the sheets into a predetermined bin of like quality material, and wherein the substantially flat sheets of material are wood, the said second conveyor is located above the said first speed-up conveyor, and the second conveyor receives the wood sheets directly from the first conveyor and carries the wood sheets directly to the predetermined sorting bin, and wherein the sheets are wood veneer and the said second conveyor is equipped with a series of overlapping flaps which form spaced pockets between the conveyor and said flaps, whereby the veneer is forced into the upper end of said pockets and restrained from moving along with the fast moving conveyor which will slide beneath the flap and the captured veneer, and said stop means having an operable and inoperable position whereby when the stop is raised to operative position, it will form a bar on the edge of the veneer dragging it out of the moving pocket and causing it to drop into the predetermined bin.

2. An apparatus as set forth in claim 1 wherein a series of laterally spaced-apart roller chains comprise the second conveyor and said flaps are fastened at one end to said roller chains, a series of belts forming said first conveyor, said series of belts forming said first conveyor being spaced laterally from each of the said roller chains whereby said flap will fall between and beneath said belts of said first conveyor whereby to form a pocket to receive the veneers to be sorted.

3. An apparatus as set forth in claim 2 comprising a third conveyor to transport veneer from a veneer drier to the speed-up conveyor, and said stop means having cut-out portions to permit the belt to pass therethrough when raised in operative position, but formed as with an elongated shape to spread out and to minimize the damage to the veneer as it hits the stop, and a stationary guide at the trailing end of the speed-up conveyor to securely hold the veneer in the pocket formed between the belt and the flap and to clear the edge of the first sorting bin, and guard means at each end of the second conveyor to restrain the wild movement of said flaps as they rotate to change directions.

4. An apparatus as set forth in claim 2 having a series of hinged stops intermediate and at the end of the bins so that a variety of sizes may be sorted.

5. An apparatus as set forth in claim 1 wherein a hinged shelf is provided for each bin so that more than one size may be sorted in that bin.

6. An apparatus as set forth in claim 1 provided with additional stop means along the longitudinal side of said bins to provide for sorting a multitude of different lengths of veneer.

7. An apparatus as set forth in claim 1 having a buffer means to retard the movement of the veneer just prior to hitting the sorting stop.

8. An apparatus as set forth in claim 7 wherein a roller is provided between the bins to assist the veneer in going from one bin to another.

9. A sorting and stacking apparatus for wood products comprising a speed-up conveyor, and a slower moving carrier conveyor, and a series of various sorting bins, a plurality of pivoted frame elements arranged near the leading edge of the speed-up belt, each of said frames being provided with a plurality of lead-in lines, said lead-in lines lying on the speed-up conveyor and beneath the slow moving conveyor, said lead-in lines terminating at the far end of said sorting bins so that when the wood products to be sorted are placed beneath a set of the lead-in lines it will go to the bin to which that set of lines are connected, and if placed above that set of lead-in lines, the wood product will be controlled and directed by the next above set of lines to its particular associated bin.

10. An apparatus as set forth in claim 9, wherein the frame extends beyond the leading edge of said speed-up conveyor and the pivot point is at the rear thereof, and all frames have a common pivot point.

11. A sorting and stacking apparatus comprising a fast-moving speed-up conveyor for conveying substantially flat pieces of wood, a second slower moving conveyor adjacent said first speed-up conveyor and having means to receive and restrain material received from said first speed-up conveyor, and means adjacent said second slower moving conveyor for forcing the sheets into a predetermined bin of like quality material, and wherein the second conveyor receives the wood directly from the first conveyor and carries the wood directly to the predetermined proper sorting bin, and wherein the said second conveyor is equipped with a series of overlapping flaps which form spaced pockets between the conveyor and said flaps, whereby the veneer is forced into the inner end of said pockets and restrained from moving along with the fast moving conveyor which will slide beneath the flap and the captured wood, and said stop means having both an operable and an inoperable position whereby when the stop is raised to operative position, it forms a bar against the edge of the wood dragging it out of the moving pocket and causing it to drop into the predetermined bin.

12. An apparatus as set forth in claim 11 wherein a series of laterally spaced-apart roller chains comprise the second conveyor and said flaps are fastened at one end to said roller chains, a series of belts forming said first conveyor, said series of belts forming said first conveyor being spaced laterally from each of the said roller chains whereby said flap will fall between and beneath said belts of said first conveyor whereby to form a pocket to receive the veneers to be sorted.

13. An apparatus as set forth in claim 11 comprising a third conveyor to transport wood from a drier to the speed-up conveyor, and said stop means having cut-out portions to permit the belt to pass therethrough when raised in operative position, but formed as with an elongated shape to spread out and to minimize the damage to the wood as it hits the stop, and a stationary guide at the trailing end of the speed-up conveyor to securely hold the wood in the pocket formed between the belt and the flap and to clear the edge of the first sorting bin, and guard means at each end of the second conveyor to restrain the wild movement of said flaps as they rotate to change directions.

14. An apparatus as set forth in claim 11 wherein a hinged shelf is provided for each bin so that more than one size may be sorted in that bin.

15. An apparatus as set forth in claim 11 provided with additional stop means along the longitudinal side of said bins to provide for sorting a multitude of different widths of wood.

16. An apparatus as set forth in claim 11 having a series of hinged stops intermediate and at the end of the bins so that a variety of sizes may be sorted.

17. An apparatus as set forth in claim 11 having a buffer means to retard the movement of the wood just prior to hitting the sorting stop.

18. An apparatus as set forth in claim 11 wherein a means is provided between the bins to assist the wood in going from one bin to another.

19. A method of sorting and stacking substantially flat sheets of material comprising moving the sheets over a transfer conveyor to a speed-up conveyor, placing the sheets on a speed-up conveyor, forcing the sheets on the speed-up conveyor into cushioning, relatively soft moving flap means on a second conveyor whereby reducing the speed of the sheets and carrying the sheets along in the cushioned, relatively soft flap means, and actuating stop means at predetermined spots, and withdrawing the sheets from the cushioned, relatively soft flap means, and placing the sheets in the proper sorting bins.

20. A method as set forth in claim 19 wherein the sheets are formed of fragile wood veneers which are rigid in one direction and flexible in the opposite direction, and individual cushioned flap means receive at indefinite intervals and frictionally carry individual thin and fragile wood veneer sheets, and lowering the top of the stack in each sorting bin as wood sheets are added, and removing the stack of fragile wood veneer sheets in the bin when the bottom of the bin reaches a predetermined low point indicating that the bin is full.

21. A sorting and stacking apparatus comprising a fast-moving, speed-up conveyor for conveying substantially flat sheets of material rigid in one direction but flexible in the opposite direction, a second slower moving conveyor adjacent said first speed-up conveyor and having relatively soft cushioning flap means to receive and restrain the material received from said first speed-up conveyor, and stopping means adjacent said second slower moving conveyor for forcing the sheets into a predetermined bin of like quality material.

22. An apparatus as set forth in claim 21 wherein the substantially flat sheets of material are thin, fragile wood veneers, the said second conveyor is located adjacent the said first speed-up conveyor, and said flaps in the second conveyor form pockets and receive the wood veneer sheets directly and at indefinite intervals from the first conveyor and frictionally carry the wood veneer sheets directly to the predetermined proper sorting bin.

References Cited

UNITED STATES PATENTS

| 2,094,339 | 9/1937 | Barber | 271—79 |
| 2,852,256 | 9/1958 | Faulls | 271—76 |
| 3,267,782 | 8/1966 | Benzing | 271—64 X |

RICHARD A. SCHACHER, Primary Examiner

U.S. Cl. X.R.

214—6; 271—64, 68, 76